United States Patent
Barnes et al.

(10) Patent No.: US 12,549,771 B2
(45) Date of Patent: Feb. 10, 2026

(54) REPRESENTATION OF SMALL IMAGES IN CONDENSED HIGH EFFICIENCY IMAGE FILE-STYLE ENCAPSULATION FORMATS

(71) Applicant: APPLE INC., Cupertino, CA (US)

(72) Inventors: Leo Barnes, Skane (SE); Davide Concion, Campbell, CA (US); David W. Singer, San Francisco, CA (US); Dimitri Podborski, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 140 days.

(21) Appl. No.: 18/422,423

(22) Filed: Jan. 25, 2024

(65) Prior Publication Data
US 2024/0292034 A1    Aug. 29, 2024

Related U.S. Application Data

(60) Provisional application No. 63/487,280, filed on Feb. 28, 2023.

(51) Int. Cl.
*H04N 19/70* (2014.01)
*G06T 7/90* (2017.01)
*G06T 9/00* (2006.01)

(52) U.S. Cl.
CPC .............. *H04N 19/70* (2014.11); *G06T 7/90* (2017.01); *G06T 9/00* (2013.01)

(58) Field of Classification Search
None
See application file for complete search history.

(56) References Cited

U.S. PATENT DOCUMENTS

| | | | |
|---|---|---|---|
| 2018/0278971 A1* | 9/2018 | Wang | H04N 21/2353 |
| 2021/0209152 A1 | 7/2021 | Fukada | |
| 2021/0250617 A1* | 8/2021 | Hannuksela | H04N 19/46 |

FOREIGN PATENT DOCUMENTS

| | | |
|---|---|---|
| EP | 3952275 A1 | 2/2022 |
| GB | 2593945 A | 10/2021 |

OTHER PUBLICATIONS

International Patent Application No. PCT/US2024/012904; Int'l Search Report and the Written Opinion; dated Apr. 15, 2024; 16 pages.

Mckeown et al.; "Forensic Considerations for the High Efficiency Image File Format (HEIF)"; Int'l Conf. on Cyber Security and Protection of Digital Services; 2020; 8 pages.

(Continued)

*Primary Examiner* — Christopher Braniff
(74) *Attorney, Agent, or Firm* — BakerHostetler

(57) ABSTRACT

Embodiments of the present disclosure provide a HEIF-based encapsulation technique that is optimized for delivery of small images over communication networks, such as the Internet. In such applications, the coded image content may have a small content payload, the spatial area of the image is small as compared to the range of image sizes that HEIF otherwise supports, and the image may contain only a limited number of representations. According to these embodiments, overhead signaling for these images may be condensed into a distinct box that is distinguishable from other types of HEIF boxes by its character code. The box may be a self-contained unit that contains both the overhead signaling and the coded content of the image itself.

35 Claims, 1 Drawing Sheet

(56) References Cited

OTHER PUBLICATIONS

3rd Generation Partnership Project; Technical Specification Group Services and System Aspects Immersive Teleconferencing and Telepresence for Remote Terminals (ITT4RT) Use Cases, Requirements and Potential Solutions (Release 17); 3GPP TR 26.862; Aug. 2021; 62 pages.
"Exif"; https://en.wikipedia.org/w/index.php?title=Exchangeable_image_file_format&oldid=502301552; Wikipedia; accessed Jun. 12, 2017; 10 pages.
Podborski et al.; "HEIF Condensed image item"; ISO/IEC JTC 1/SC 29/WG 364572v2; Jul. 2023; 11 pages.
L. Barnes; "HEIF needs a reduced headed mode #59"; https://github.com/MPEGGroup/FileFormat/issues/59; GitHub; Jun. 2022; accessed Apr. 3, 2024; 2 pages.
International Patent Application No. PCT/US2024/012904; Int'l Written Opinion; dated Jan. 13, 2025; 9 pages.
M. Hannuksela et al.; "Overview of the High Efficiency Image File Format"; Joint Collaborative Team on Video (JCT-VC) of ITU-T SG 16 WP 3 and ISO/IEC JTC 1/SC 29/WG 11, 22nd Meeting: Geneva, CH; Oct. 15-21, 2015; Document No. JCTVC-V0072; 12 pages.
D. Singer et al.; "MPEG-21 File Format"; The Moving Picture Experts Group (MPEG) webpage https://mpeg.chiariglione.org/standards/mpeg-21/file-format; Part No. 9; MPEG doc No. N7925; Apr. 2006; 1 page.
R. Gellens et al.; "The 'Codecs' and 'Profiles' Parameters for Bucket" Media Types; Internet Engineering Task Force (IETF); Standards Track; Aug. 2011; 19 pages.
P. Amon et al.; "File Format for Scalable Video Coding"; IEEE Transactions on Circuits and Systems for Video Technology, vol. 17, No. 9, Sep. 2007; pp. 1174-1185.
International Patent Application No. PCT/US2024/012904; Int'l Preliminary Report on Patentability; dated May 6, 2025; 20 pages.

* cited by examiner

100

200

REPRESENTATION OF SMALL IMAGES IN CONDENSED HIGH EFFICIENCY IMAGE FILE-STYLE ENCAPSULATION FORMATS

CLAIM FOR PRIORITY

This application benefits from priority of U.S. application Ser. No. 63/487,280, entitled "Representation of Small Images in Condensed High Efficiency Image File-Style Encapsulation Formats" and filed Feb. 28, 2023, the disclosure of which is incorporated herein in its entirety.

BACKGROUND

The present disclosure relates to distribution of image content over computer networks and, in particular, to distribution of images using container files such as those that use the HEIF format.

The distribution of image and video content is ubiquitous in modern networking applications. Image content typically is coded according to compression algorithms and made available by source devices on a computer network. The image content is retrieved by sink devices, which decode the coded image content to obtain a decompressed version of the image content and consume the decoded image content, typically, by display.

There is enormous variation in the types of image content that is made available. Image content may be represented as a single still image, a short sequence of images, or by full motion picture video. Image content may be represented in relatively small image sizes (e.g., thumbnails) or as frames of high-definition 1080p, 4K, or 8K content. Image content may be represented using different bit depths and different color spaces. The image content may be compressed by different compression algorithms. To ensure that the image content provided by source devices can be interpreted properly by sink devices, interface standards have been developed that define how source devices represent such information and how sink devices interpret it. The High Efficiency Image File (commonly, "HEIF") Format (ISO/IEC 23008-12) is an example of a container format that defines syntaxes for representations of such information. HEIF works cooperatively with a variety of compression algorithms, including, for example, HEVC and AV1.

Currently, the HEIF image format is optimized for large and complex files, typically consisting of many tiles or sub-images that share properties. Many of the properties and boxes are optimized for flexibility and extensibility. All of this comes at the cost of header overhead. As an example, the minimum size of the HEIF boxes required for an AVIF branded file (e.g., AV1 coded image information encapsulated in a HEIF container file) is around 300 bytes. While such overhead "costs" typically do not present an issue when images are large, the costs become significant when dealing with very small files. For an AVIF file that is 80×60 pixels, the overhead may end up being ~30% of the compressed size.

DETAILED DESCRIPTION

Embodiments of the present disclosure provide a HEIF-based encapsulation technique that is optimized for delivery of small images over communication networks, such as the Internet. In such applications, the coded image content may have a small content payload, such as less than 64 KB. Typically, in such applications, the spatial area of the image is small as compared to the range of image sizes that HEIF otherwise supports (e.g., less than 640×480 pixels). The image may contain only a limited number of representations; for example, it may consist of a main image and optionally an alpha plane. It may contain an ICC profile and/or CICP color information. It may contain Exif and XMP metadata.

According to these embodiments, overhead signaling and payload content of an image may be condensed into a single, distinct box. In HEIF, boxes are identifiable by a four-character code (4CC) indicating the type of the box. Thus, the box proposed in the present disclosure may be distinguishable from other types of HEIF boxes by its unique character code and box type. For discussion purposes within this document, assume that the box can be identified by the code "coni" to indicate that the box is a Condensed Image box. An alternative character code may be used so long as it is distinct from other box identifiers defined in the governing standard.

The proposed condensed image box may be used in place of other boxes, such as the 'meta' box, currently employed in HEIF (ISO/IEC 23008-12). In HEIF, use of a 'meta' box requires use of subordinate boxes such as 'hdlr,' 'dinf,' 'pitm,' 'iinf,' 'iprp' (which itself may contain subordinate boxes), 'iloc,' 'iref,' and 'mdat' (which contains the image payload). The proposed condensed image box may provide the information content of these other HEIF boxes for the image use cases contemplated, but in a highly-condensed format, which leads to greater efficiency in representation.

Figure 1:
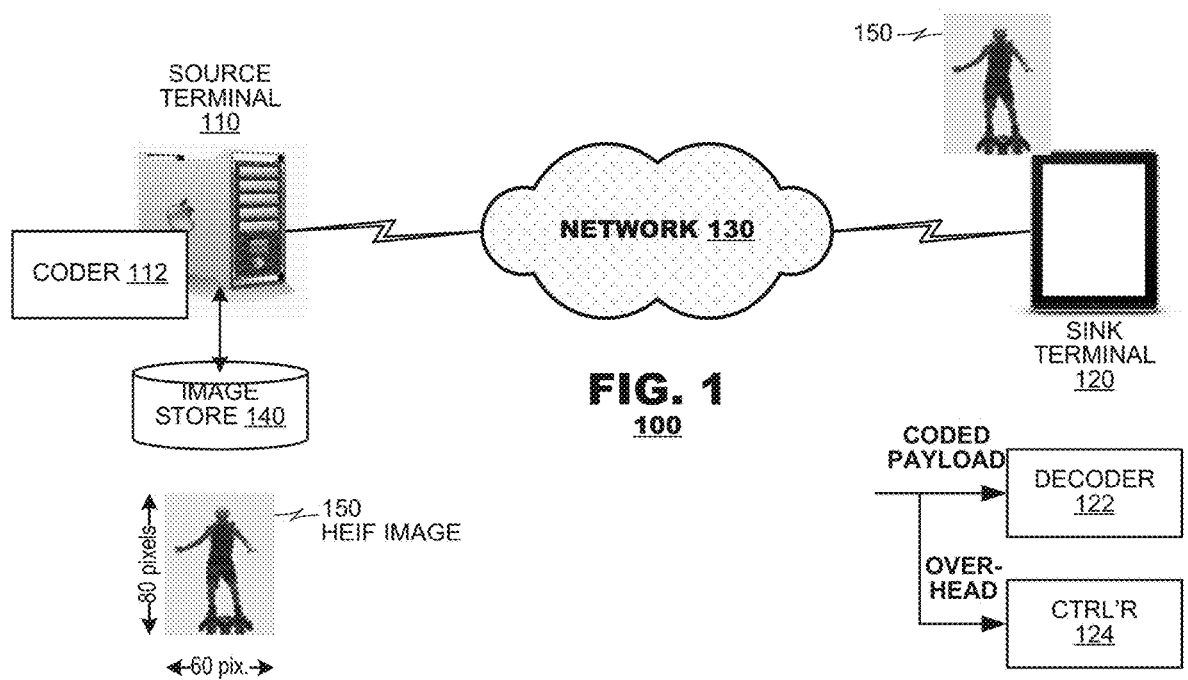
FIG. 1 is a system diagram illustrating a communication system suitable for use with the proposed embodiments.

FIG. 1 is a system diagram illustrating a communication system 100 suitable for use with the proposed embodiments. FIG. 1 illustrates a source terminal 110 and a sink terminal 120 provided in mutual communication by a network 130. The source terminal 110 may make image content available for download and consumption by the sink terminal 120. For this purpose, the source terminal 110 either may generate image content on an on-the-fly basis or, more often, it may store the image information on a local storage device 140. For example, FIG. 1 illustrates an image 150 that is stored by the source terminal 110 and made available to the sink terminal 120 over the network 130. The image 150 may be encapsulated according to HEIF-style representation techniques, which includes signaling of image overhead information and image content in a common box.

Source and sink terminals 110, 120 may operate according to interface specifications that define how image information is represented. As relevant to the present discussion, such information may be classified as "payload" information, which contains the image content of the image information, and "overhead" information, which represents characteristics of the payload information (such as the height and width of the payload image, a coding protocol applied to the payload image, a color space used to represent the payload image, and the like). Image information typically will have been coded by a coder 112, which applies a selected compression algorithm to the image content, before it is made available by a source terminal 110. A sink terminal 120 typically has one or more decoders 122 available to decode images. In application, a controller 124 at the sink terminal 120 will review overhead information provided with the image 150 and engage an appropriate decoder 122 at the sink device to invert coding processes applied by the coder 112.

In FIG. 1, the source terminal 110 is illustrated as a server and the sink terminal 120 is illustrated as a tablet computer, but the principles of the present disclosure are not so limited. Embodiments of the present invention find application with laptop computers, tablet computers, media players and/or dedicated video conferencing equipment. The network 130 represents any number of networks that convey information between the terminals 110, 120, including, for example, wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless explained hereinbelow.

Figure 2:
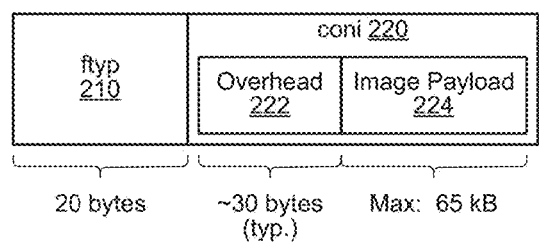
FIG. 2 illustrates an encapsulation data structure image according to an embodiment of the present disclosure.

FIG. 2 illustrates a data structure 200 of an image 150 (FIG. 1) according to an embodiment of the present disclosure. As illustrated, an image 150 may be represented by a pair of boxes 210 and 220. A first box 210 may be an 'ftyp' (file type) box for the image 150. The 'ftyp' box 210 may contain data indicating that the image is composed of a 'coni' box 220 and identifying its location. The 'coni' box 220 may contain all overhead 222 necessary to interpret a coded payload 224 of the image, which itself is contained within the 'coni' box 220.

During operation, a sink terminal 120 (FIG. 1) may access the image's 'ftyp' and 'coni' boxes 210, 220. Review of the 'ftyp' box 210 sets a context for the sink terminal 120 to interpret the 'coni' box 220. The sink terminal's controller 124 may review overhead signaling 222 of the 'coni' box 220 to determine how the coded payload 224 is represented. The controller 124 may engage an appropriate decoder 122 at the sink terminal 120 to recover a decoded image from the coded payload 224.

As discussed, embodiments of the present disclosure provide overhead information of the image 150 in a highly-condensed form. A first embodiment contemplates that the overhead elements 222 of the 'coni' box 220 will be entirely self-contained and provide all information necessary for a decoder 122 to recover image information from a coded payload 224. In one example, the overhead 222 portion of a 'coni' box may be defined as follows:

---

Layout of 'coni' box
```
aligned(8) class CondensedImageBox extends Box('coni') {
  // 2 or 3 bytes of flags
  unsigned int(2) version = 0;
  unsigned int(4) bitDepthMinusOne;
  unsigned int(1) isMonochrome;
  unsigned int(1) extraFlags;
  unsigned int(1) largeWidth;
  unsigned int(1) largeHeight;
  unsigned int(1) hasICC;
  unsigned int(1) hasNCLX;
  unsigned int(1) smallNCLX;
  unsigned int(1) hasAlpha;
  unsigned int(1) hasExif;
  unsigned int(1) hasXMP;
  if (extraFlags) {
    unsigned int(3) orientationMinusOne;
    unsigned int(1) explicitCodecTypes;
```

-continued
```
    unsigned int(1) largeCodecConfig;
    unsigned int(1) premultipliedAlpha;
    unsigned int(1) hasExtendedProperties;
    unsigned int(1) largeExtendedProperties;
  }
  // End of flags
  if (explicitCodecTypes) {
    unsigned int(32) infeType;
    unsigned int(32) codecConfigType;
  }
  unsigned int(largeWidth ? 16 : 8) widthMinusOne;
  unsigned int(largeHeight ? 16 : 8) heightMinusOne;
  if (hasICC) {
    unsigned int(16) iccDataSize;
  }
  if (hasNCLX) {
    if (smallNCLX) {
      unsigned int(5) colorPrimaries;
      unsigned int(5) transferCharacteristics;
      unsigned int(5) matrixCoefficients;
      unsigned int(1) fullRange;
    }
    else {
      unsigned int(16) colorPrimaries;
      unsigned int(16) transferCharacteristics;
      unsigned int(16) matrixCoefficients;
      unsigned int(1) fullRange;
      unsigned int(7) reserved = 0;
    }
  }
  // Explicitly set color to sRGB if nothing is specified
  if (!hasNCLX && !hasICC) {
    unsigned int(16) colorPrimaries = 1;
    unsigned int(16) transferCharacteristics = 13;
    unsigned int(16) matrixCoefficients = 6;
    unsigned int(1) fullRange = 1;
    unsigned int(7) reserved = 0;
  }
  unsigned int(largeCodecConfig ? 16 : 8) mainItemCodecConfigSize;
  unsigned int(16) mainItemDataSize;
  if (hasExtendedProperties) {
    unsigned int(largeExtendedProperties ? 16 : 8)
      mainExtendedPropertiesSize;
  }
  if (hasAlpha) {
    // Alpha has the following requirements:
    // Same dimensions as main
    // Same bit depth as main
    // Same codec as main
    // Monochrome
    // If hasAlpha is true and alpha size is zero, it means that main
    image codec supports interleaved alpha
    unsigned int(largeCodecConfig ? 16 : 8) alphaItemCodecConfigSize;
    unsigned int(16) alphaItemDataSize;
    if (hasExtendedProperties) {
      unsigned int(largeExtendedProperties ? 16 : 8)
        alphaExtendedPropertiesSize;
    }
  }
  if (hasExif) {
    unsigned int(16) exifDataSize;
  }
  if (hasXMP) {
    unsigned int(16) xmpDataSize;
  }
``` where these syntax elements convey information as follows:

| Syntax Element | Meaning |
| --- | --- |
| version | Indicates a coding version of the 'coni' box. The version number may be incremented as 'coni' box syntax definitions are revised. |
| bitDepthMinusOne | Signals the bit depth in the file. Allows for a bit depth of 1-16. Conveys similar information as 'pixi' property in HEIF. |
| isMonochrome | Signals if image is monochrome or RGB/YUV. Conveys similar information as 'pixi' property in HEIF. |

-continued

| Syntax Element | Meaning |
| --- | --- |
| extraFlags | Signals whether 1 extra byte of flags is present in the 'coni' overhead 222 or not. |
| largeWidth | Signals whether width is 1 or 2 bytes. |
| largeHeight | Signals whether height is 1 or 2 bytes. |
| hasICC | Signals whether image has an ICC profile or not. Conveys similar information as a 'colr' box with type 'prof' or 'rICC' in HEIF |
| hasNCLX | Signals whether image has NCLX color info or not. Conveys similar information as a 'colr' box with type 'nclx' in HEIF. |
| smallNCLX | Signals whether the image has a small (reduced) NCLX box or a full NCLX box. |
| hasAlpha | Signals whether the image has alpha or not. Conveys similar information as an 'auxl' item reference between main and alpha item and an auxiliary image type set to alpha in HEIF. |
| hasExif | Signals whether the image has Exif metadata or not. Conveys similar information as a 'cdsc' (content describes) item reference between main and Exif item in HEIF. |
| hasXMP | Signals whether the image has XMP metadata or not. Conveys similar information as a 'cdsc' (content describes) item reference between main and XMP item in HEIF. |
| orientationMinusOne | Signals the Exif orientation (values 1 to 8) of the image. Conveys similar information as 'imir' and 'irot' item properties in HEIF. |
| explicitCodecTypes | Signals whether the codec configuration and item type is explicitly signaled in the 'coni' box, or whether it can be inferred from the file brand. |
| largeCodecConfig | Signals that the codec configuration has a uint16 size rather than a uint8 size |
| premultipliedAlpha | Signals whether the main pixels have been premultiplied by the alpha. Conveys similar information as a 'prem' property in HEIF. |
| hasExtendedProperties | Signals whether the file has extended item properties. |
| largeExtendedProperties | Signals that the extended properties have a uint16 size rather than a uint8 size. |
| infeType | Identifies the type of the main (and optional alpha) item in the 'infe' box in HEIF. For AVIF, this would be 'av01'. |
| codecConfigType | Identifies the four-char-code for the codec configuration property in HEIF. For AVIF this would be 'av1C'. |
| widthMinusOne | Width of the image. Conveys similar information as an 'ispe' item property in HEIF. |
| heightMinusOne | Height of the image. Conveys similar information as an 'ispe' item property in HEIF. |
| iccDataSize | Size of the ICC profile payload if present. 0 if not present. Conveys similar information as a 'colr' box with type 'prof' in HEIF. |
| colorPrimaries | NCLX color info, represented in either a 5 bit word or a 16 bit word depending on the state of smallNCLX. Conveys similar information as a 'colr' box with type 'nclx' in HEIF. |
| transferCharacteristics | NCLX color info, represented in either a 5 bit word or a 16 bit word depending on the state of smallNCLX. Conveys similar information as a 'colr' box with type 'nclx' in HEIF. |
| matrixCoefficients | NCLX color info, represented in either a 5 bit word or a 16 bit word depending on the state of smallNCLX. Conveys similar information as a 'colr' box with type 'nclx' in HEIF. |
| fullRange | NCLX color info. Conveys similar information as a 'colr' box with type 'nclx' in HEIF. |
| reserved | Provides padding. |
| mainItemCodecConfigSize | The size of the codec configuration box. For AVIF this box is the 'av1C' box. |
| mainItemDataSize | The size of the compressed main image item. Conveys similar information as an entry in the 'iloc' box in HEIF. |
| mainExtendedPropertiesSize | The size of the extended properties that apply to the main image item. |
| alphaItemCodecConfigSize | The size of the alpha codec configuration box. 'av1C' box in AVIF. |
| alphaItemDataSize | The size of the compressed alpha image item. Conveys similar information as an entry in the 'iloc' box in HEIF. |
| alphaExtendedPropertiesSize | The size of the extended properties that apply to the alpha image item. |
| exifDataSize | The size of the Exif metadata payload. Conveys similar information as an entry in the 'iloc' box in HEIF. |
| xmpDataSize | The size of the XMP metadata payload. Conveys similar information as an entry in the 'iloc' box in HEIF. |

It is expected that an overhead portion 222 that provides the foregoing information will provide sufficient information to a sink terminal 120 (FIG. 1) for a large number of the small image coding use cases discussed above. Following this overhead portion 222, a coded payload 224 may be represented as follows:

```
// Actual data
unsigned int(8) alphaItemCodecConfig[alphaItemCodecConfigSize]; //
Codec config body data
unsigned int(8) mainItemCodecConfig[mainItemCodecConfigSize]; //
Codec config body data
unsigned int(8)
alphaExtendedProperties[alphaExtendedPropertiesSize]; // Box
sequence
unsigned int(8) mainExtendedProperties[mainExtendedPropertiesSize];
// Box sequence
unsigned int(8) iccData[iccDataSize]; // ICC profile data
unsigned int(8) alphaData[alphaItemDataSize]; // Alpha elementary
stream
unsigned int(8) mainData[mainItemDataSize]; // Main image elementary
stream
unsigned int(8) exifData[exifDataSize]; // Exif metadata
unsigned int(8) xmpData[xmpDataSize]; // XMP metadata
}
```

In cases where certain payloads are not present (e.g., alpha images, Exif metadata or XMP metadata), the payload elements listed above may have zero length.

As shown in FIG. 2, the overhead and payload 222, 224 may be contained in a common box.

As explained, in practice, source and sink terminals 110, 120 (FIG. 1) will exchange images 150 according to a protocol that not only defines a syntax for representation of overhead information 222 but also defines rules for interpreting those syntax elements. In an embodiment, the extended properties data may store a sequence of item properties that apply to the item. In such embodiments, the interface protocol may specify that:

1. The extended properties shall not contain 'ispe', 'pixi', 'imir', 'irot' or a codec config box.
2. The extended properties shall not contain a 'colr' box if hasICC or hasNCLX are true.
3. The order of properties are as follows:
    a) 'ispe', codec config, 'pixi', 'colr-ICC', 'colr-NCLX' as synthesized from the 'coni' box
    b) extended properties in the order given
    c) 'irot', 'imir' as synthesized from the 'coni' box As discussed, the proposed embodiments may lead to a condensed representation of HEIF overhead information, which leads to higher efficiency than would occur with other HEIF-based encapsulation techniques. Table 1 compares representations that would be obtained for an exemplary 80×60 pixel image coded in an AVIF branded representation, e.g., an AV1 coded image contained in an HEIF encapsulation image. For discussion purposes, assume that the image payload is coded as 1,083 bytes, it has 400 bytes of Exif metadata, it has an NCLX color representation, and it involves both rotation and mirroring.

Prior to the advent of this proposal, as shown below, HEIF would require 375 bytes of overhead information to communicate the image whereas a 'coni' block as described above would require only 44 bytes:

TABLE 2

| Boxes Contained within the HEIF 'meta' block | Size in HEIF | Comparison to 'coni' | Notes |
| --- | --- | --- | --- |
| 'hdlr' (Handler Reference Box) | 33 bytes | 0 bytes | The HEIF 'hdlr' box does not provide useful information for the 'coni' use case. |
| 'dinf' (Data Information Box) | 36 bytes | 0 bytes | The HEIF 'dinf' box does not provide useful information for the 'coni' use case. |
| 'pitm' (Primary Item Box) | 14 bytes | 0 bytes | In HEIF, 'pitm' identifies which image in a file is the primary. The 'pitm' box does not provide useful information in the 'coni' use case, which contemplates a single image representation. |
| 'iinf' (Item Information Box) | 56 bytes | 0 bytes | In 'coni,' 0 bytes arises in the case where explicitCodecTypes is false and a brand is defined that implicitly sets the infeType and codecConfigType. |
| 'iprp' (Item Properties Box | 8 bytes | 0 bytes | In HEIF, 'iprp' often contains nested sub-boxes that may be large. Nested boxes can be avoided in 'coni.' |
| 'ipco' (Item Property Container Box) | 8 bytes | 0 bytes | In HEIF, 'ipco' is nested within 'iprp.' 'ipco' declares all properties used within a HEIF file. |
| 'ipma' (Item Property Association Box) | 25 bytes | 0 bytes | In HEIF, 'ipma' is nested within 'iprp.' 'ipma' declares which items use which properties. 'ipma' is not needed in the 'coni' use case, where all properties apply to its single image. |
| 'iloc' (Item Location Box) | 44 bytes | 4 bytes | In 'coni,' analogous data is represented by mainItemDataSize & exifDataSize. |
| 'iref' (Item Reference Box) | 26 bytes | 0 bytes | In 'coni,' when an Exif is present, the Exif relates only to the main image. |

TABLE 2-continued

| Boxes Contained within the HEIF 'meta' block | Size in HEIF | Comparison to 'coni' | Notes |
|---|---|---|---|
| 'av1C' (AV1 Decoder Configuration Record) | 12 bytes | 5 bytes | In HEIF, 'av1C' is nested within 'ipco.' 'av1C' identifies a codec configuration. In both 'av1C' and 'coni,' the AV1 Decoder Configuration Record payload has a size of 4 bytes. |
| 'ispe' (Image Spatial Extents) | 20 bytes | 2-4 bytes | In HEIF, 'ispe' is nested within 'ipco.' In 'coni,' the size varies based on settings of large Width/largeHeight flags. |
| 'pixi' (Pixel Information Box) | 16 bytes | 5 bits in flag bytes | In HEIF, 'pixi' is nested within 'ipco.' 'pixi' describes the number of channels and bit depth. |
| 'colr' (Colour Information Box) | 19 bytes | 2 bytes | In HEIF, 'colr' is nested within 'ipco.' 'colr' describes the color space that applies to the image information. In 'coni,' such information is provided in hasNCLX & smallNCLX. |
| 'imir' (Image Mirroring Box) | 9 bytes | 1 bytes | In HEIF, 'imir' is nested within 'ipco.' 'imir' indicates if mirroring applies to the image. |
| 'irot' (Image Rotation Box) | 9 bytes | 1 bytes | In HEIF, 'irot' is nested within 'ipco.' 'irot' indicates if rotation applies to the image. In 'coni,' the same bits that indicates if mirroring applies to the image also provides information regarding rotation. |
| Total Overhead: | 375 bytes | 44 bytes | |

As shown in this example, overhead signaling in the HEIF representation is approximately 34% of the size of the coded image (375 bytes/1083 bytes). By comparison, the 'coni' representation is far more efficient. The overhead signaling is approximately 4% of the size of the coded image (44 bytes/1083 bytes). And, because a 'coni' box contains the payload content 224 of the image 150, the 8-bit overhead of an 'mdat' box also can be avoided.

As in the ordinary HEIF case, the principles of the present disclosure find application with both codec-agnostic and codec-specific brands. When a 'coni' box 220 is used in a codec-agnostic application, the explicitCodecTypes flag in the box 220 shall be set to true, and the infeType and codecConfigType fields shall be specified. This information defines for the sink terminal 120 the type of decoder 122 to be used when decoding the payload 224.

When a 'coni' box 220 is used in a codec-specific application, the file's ftyp box 210 may contain a brand identifier that identifies both that the file contains a coni box 220 and that the coni box is associated with a particular codec type. For example, a brand 'cna1' may identify that the coni box 220 is intended to be used with an AV1 coder. By using such a brand, the ftyp box 210 may define default codec information for the 'coni' box 220 as follows:
  infeType: av01
  codecConfigType: av1C In this application, these default values may apply if the explicitCodecTypes flag is not set within the 'coni' box's overhead 222. These default may be overridden by setting the explicitCodecTypes flag and identifying codec parameters with additional signaling. This embodiment can lead to increased efficiency by omitting overhead bytes that otherwise would be consumed to convey codec information (8 bytes), and it allows the ftyp box 210 to omit having a separate brand to identify a codec.

As discussed, in the primary use case, the 'coni' box may be employed as a self-contained box that contains all overhead 222 necessary for decode and consumption of the image information in the payload 224 content of an image. In this case, other boxes defined in HEIF, such as the 'meta,' 'moov,' and 'moof' boxes, are not used and the signaling overhead that those boxes consume can be avoided. The 'coni' box, therefore, leads to a highly-efficient representation of the overhead needed to decode a coded payload 224.

Although the primary use case expects that the 'coni' box will obviate the need for other boxes, the principles of the present disclosure allow 'coni' boxes to be employed cooperatively with these other boxes if desired by content publishers. In one use case, it may be desired to make a 'coni'-coded image (e.g., 150 in FIG. 1) available both as stand-alone image content and as part of a video sequence. In such an application, overhead corresponding to other portions of a video (e.g., frames at other temporal locations of a video sequence) may be represented using 'moov' or 'moof' boxes as desired. Payload content of these other portions of video may be represented in 'mdat' boxes. It is expected that an ftyp box 210 of the file will indicate that a 'coni' box 220 is the second box contained within the file and identify types of other boxes (not shown in FIG. 2) that follow the 'coni' box in order.

In such applications, a sink terminal 120 may operate according to predetermined rules to integrate the image content obtained by decode of a coded payload 224 with content obtained by decode of these other portions of video. First, the sink terminal 120 may operate according to interpretive rules that specify that image(s) contained within the 'coni' box 220 will be assigned respective identifies. For example, a main image decoded from the payload 224 may be assigned an item ID of 1, an alpha image decoded from the payload 224 may be assigned an item ID of 2, an Exif metadata item decoded from the payload 224 may be assigned an item ID of 3, and an XMP metadata item decoded from the payload 224 may be assigned an item ID of 4. According to the terminals' interpretive rules, a 'meta' box will not be allowed to define items with such identifiers (e.g., it shall not list them in its 'infe' box), it may not add item properties to the items provided by the 'coni' box 220 (e.g., it shall not list them in an 'ipma' box), and it may not describe the location of items provided by the 'coni' box 220.

A sink terminal 120, however, may generate a virtual 'meta' box representing the items in the 'coni' box according to a predetermined protocol. Further, a 'meta' box may add item references from items in the 'meta' box to items in the 'coni' box. A 'meta' box, for example may add additional metadata to items from the 'coni' box, add additional thumbnails to items from the 'coni' box, use items from the 'coni' box as inputs for derived items in the 'meta' box, and/or add groupings between 'coni' items and 'meta' items. Thus, items recovered from the payload 224 portion and items from these other boxes may be integrated into a final representation of content according to processes defined either in a governing interface specification or in these other boxes. In this event, the 'coni' box 220 remains a self-contained box containing all data needed for decode of the payload 224 within the box 220.

The foregoing discussion has described operation of embodiments of the present disclosure in the context of coding systems and decoding systems provided within source and sink terminals. Commonly, these components are provided as electronic devices. They can be embodied in integrated circuits, such as application specific integrated circuits, field programmable gate arrays and/or digital signal processors. Alternatively, they can be embodied in computer programs that are stored in memory and execute on processing devices of personal computers, notebook computers, computer servers or mobile computing platforms such as smartphones and tablet computers. Similarly, coders and decoders can be embodied in integrated circuits, such as application specific integrated circuits, field programmable gate arrays and/or digital signal processors, or they can be embodied in computer programs that are stored in memory and execute on processing devices of personal computers, notebook computers, computer servers or mobile computing platforms such as smartphones and tablet computers. Decoders commonly are packaged in consumer electronics devices, such as gaming systems, DVD players, portable media players, tablet computers, smartphones, smartwatches, virtual reality goggles, augmented reality goggles, automotive media system, aircraft media systems and the like. They also can be packaged in consumer software applications such as video games, browser-based media players and the like. And, of course, these components may be provided as hybrid systems that distribute functionality across dedicated hardware components and programmed general purpose processors as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method of representing image data, comprising:
coding an image according to an image compression algorithm;
storing the coded image on a network in an encapsulated representation that includes a pair of boxes, wherein:
a first box identifies the second box by its type, and
a second box is a self-contained unit that includes an overhead portion and a payload portion, the overhead portion providing sufficient metadata to identify a type of compression algorithm applied to the image, a size of the image, a color space applicable to the image, and an orientation of the image, and the payload portion containing coded content of the image.

2. The method of claim 1, wherein the overhead portion includes an identification of a bit depth of image content represented by the payload portion.

3. The method of claim 1, wherein the overhead portion includes an indication whether image content represented by the payload portion is monochrome.

4. The method of claim 1, wherein the overhead portion includes an indication of an ICC profile applicable to image content represented by the payload portion.

5. The method of claim 1, wherein the overhead portion includes an indication of NCLX color information applicable to image content represented by the payload portion.

6. The method of claim 1, wherein the overhead portion includes a flag identifying a size of height and a width information relating to image content represented by the payload portion.

7. The method of claim 1, wherein, for image content that contains an alpha channel, the overhead portion contains an indication whether the image content represented by the payload portion contain an alpha channel.

8. The method of claim 1, wherein, for image content that contains Exif metadata, the overhead portion contains an indication whether the image content represented by the payload portion contains Exif metadata.

9. The method of claim 1, wherein, for image content that contains XMP metadata, the overhead portion contains an indication whether the image content represented by the payload portion contains XMP metadata.

10. The method of claim 1, wherein the second box further contains a box sequence of item properties containing information not already covered by the overhead portion.

11. The method of claim 1, wherein the first box contains a brand identifier that identifies a default codec type applicable to the payload portion of the second box.

12. A non-transitory computer readable medium storing program instructions that, when executed by a processing device, causes the processing device to perform a method comprising:
coding an image according to an image compression algorithm;
storing the coded image on a network in an encapsulated representation that includes a pair of boxes, wherein:
a first box identifies the second box by its type, and
a second box is a self-contained unit that includes an overhead portion and a payload portion, the overhead portion providing sufficient metadata to identify a type of compression algorithm applied to the image, a size of the image, a color space applicable to the image, and an orientation of the image, and the payload portion containing coded content of the image.

13. The medium of claim 12, wherein the overhead portion includes an identification of a bit depth of image content represented by the payload portion.

14. The medium of claim 12, wherein the overhead portion includes an indication whether image content represented by the payload portion is monochrome.

15. The medium of claim 12, wherein the overhead portion includes an indication of an ICC profile applicable to image content represented by the payload portion.

16. The medium of claim 12, wherein the overhead portion includes an indication of NCLX color information applicable to image content represented by the payload portion.

17. The medium of claim 12, wherein the overhead portion includes a flag identifying a size of height and a width information relating to image content represented by the payload portion.

18. The medium of claim 12, wherein, for image content that contains an alpha channel, the overhead portion contains an indication whether the image content represented by the payload portion contain an alpha channel.

19. The medium of claim 12, wherein, for image content that contains Exif metadata, the overhead portion contains an indication whether the image content represented by the payload portion contains Exif metadata.

20. The medium of claim 12, wherein, for image content that contains XMP metadata, the overhead portion contains an indication whether the image content represented by the payload portion contains XMP metadata.

21. The medium of claim 12, wherein the second box further contains a box sequence of item properties containing information not already covered by the overhead portion.

22. The medium of claim 12, wherein the first box contains a brand identifier that identifies a default codec type applicable to the payload portion of the second box.

23. A method of decoding image data, comprising:
retrieving from a network in an encapsulated representation of a coded image, the representation including a pair of boxes that includes:
a first box that identifies the second box by its type, and
a second box that is a self-contained unit and includes an overhead portion and a payload portion, the overhead portion providing sufficient metadata to identify a type of compression algorithm applied to the image, a size of the image, a color space applicable to the image, and an orientation of the image, and the payload portion containing coded content of the image;
interpreting content of the second box according to the type identified in the first box;
configuring an image decoder according to the metadata provided in the overhead portion; and
decoding the payload portion according to the configured image decoder.

24. The method of claim 23, wherein the overhead portion includes an identification of a bit depth of image content represented by the payload portion.

25. The method of claim 23, wherein the overhead portion includes an indication whether image content represented by the payload portion is monochrome.

26. The method of claim 23, wherein the overhead portion includes an indication of an ICC profile applicable to image content represented by the payload portion.

27. The method of claim 23, wherein the overhead portion includes an indication of NCLX color information applicable to image content represented by the payload portion.

28. The method of claim 23, wherein the overhead portion includes a flag identifying a size of height and a width information relating to image content represented by the payload portion.

29. The method of claim 23, wherein, for image content that contains an alpha channel, the overhead portion contains an indication whether the image content represented by the payload portion contain an alpha channel.

30. The method of claim 23, wherein, for image content that contains Exif metadata, the overhead portion contains an indication whether the image content represented by the payload portion contains Exif metadata.

31. The method of claim 23, wherein, for image content that contains XMP metadata, the overhead portion contains an indication whether the image content represented by the payload portion contains XMP metadata.

32. The method of claim 23, wherein the second box further contains a box sequence of item properties containing information not already covered by the overhead portion.

33. The method of claim 23, wherein the first box contains a brand identifier that identifies a default codec type applicable to the payload portion of the second box.

34. A coding system comprising:
a processor,
a memory device storing program instructions that, when executed by the processor, cause the processor to execute an encoding method, comprising:
coding an image according to an image compression algorithm;
storing the coded image in an encapsulated representation that includes a pair of boxes, wherein:
a first box identifies the second box by its type, and
a second box is a self-contained unit that includes an overhead portion and a payload portion, the overhead portion providing sufficient metadata to identify a type of compression algorithm applied to the image, a size of the image, a color space applicable to the image, and an orientation of the image, and the payload portion containing coded content of the image.

35. A decoding system comprising:
a processor,
a memory device storing program instructions that, when executed by the processor, cause the processor to execute a decoding method, comprising, responsive to receipt of an encapsulated representation of a coded image, the representation including a pair of boxes that includes a first box that identifies a second box by its type, and the second box that is a self-contained unit and includes an overhead portion and a payload portion, the overhead portion providing sufficient metadata to identify a type of compression algorithm applied to the image, a size of the image, a color space applicable to the image, and an orientation of the image, and the payload portion containing coded content of the image:
interpreting content of the second box according to the type identified in the first box;
configuring an image decoder according to the metadata provided in the overhead portion; and
decoding the payload portion according to the configured image decoder.

* * * * *